United States Patent [19]

Schommer

[11] 3,973,354
[45] Aug. 10, 1976

[54] ELECTRIC WORM COLLECTING APPARATUS

[76] Inventor: John Schommer, 1184 Bryan, Tustin, Calif. 92680

[22] Filed: June 23, 1975

[21] Appl. No.: 589,458

[52] U.S. Cl. .................................................. 47/1.3
[51] Int. Cl.² ........................................ A01M 1/00
[58] Field of Search ................... 47/1.3; 119/1; 43/1

[56] References Cited
UNITED STATES PATENTS

| | | | |
|---|---|---|---|
| 1,932,237 | 10/1933 | Warner | 47/1.3 |
| 2,450,597 | 10/1948 | Karnowski | 47/1.3 |
| 2,607,164 | 8/1952 | Fenton | 47/1.3 |
| 2,770,075 | 11/1956 | Moore | 47/1.3 |
| 3,763,593 | 10/1973 | Guthrie | 47/1.3 |
| 3,793,770 | 2/1974 | Johnson | 47/1.3 |
| 3,820,279 | 6/1974 | Sieper | 47/1.3 |
| 3,898,756 | 8/1975 | Tolle | 47/1.3 X |

*Primary Examiner*—Robert E. Bagwill
*Attorney, Agent, or Firm*—Gary Appel

[57] ABSTRACT

An electric worm collecting apparatus comprises a partially insulated, electrically conducting rod having an uninsulated lower end portion adapted for inserting into the ground and having an upper portion formed at a right angle to the lower portion. Part of the upper portion is curved through 180° to provide a handle for inserting the lower end portion into the ground. A conductor, preferably having a polarized end plug, is provided for connecting an upper end of the rod to an A.C. voltage source. A normally off, momentary on switch is provided adjacent to the rod to energize the rod from the A.C. voltage source when the lower end is inserted in the ground, thereby causing a worm collecting current in the ground around the rod. A fuse is included in the conductor to provide current overload protection. A diode is provided to rectify the A.C. voltage to enhance the worm collecting effect by providing a pulsating but non-oscillating current. In a variation adapted for use with a D.C. voltage source, a pair of similar rods, maintained in mutual spaced relationship and in mutual electrical isolation by spacers is employed. The rods are provided with an electrical conductor terminating in a plug adapted to be plugged into an automobile-type cigarette lighter receptacle. A rod energizing switch is provided and D.C. voltage chopping means converts D.C. voltage received from the source into a pulsating voltage to enhance the worm collecting effect.

16 Claims, 11 Drawing Figures

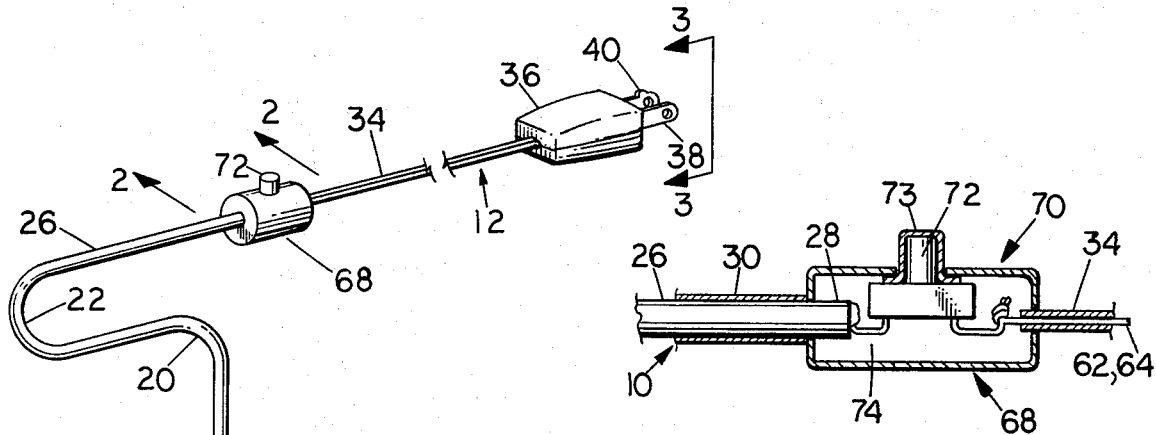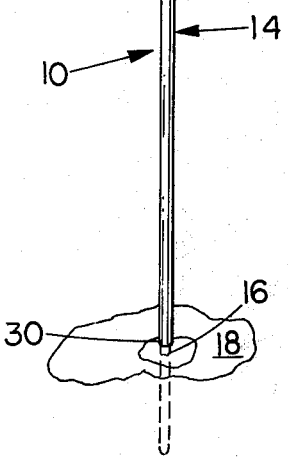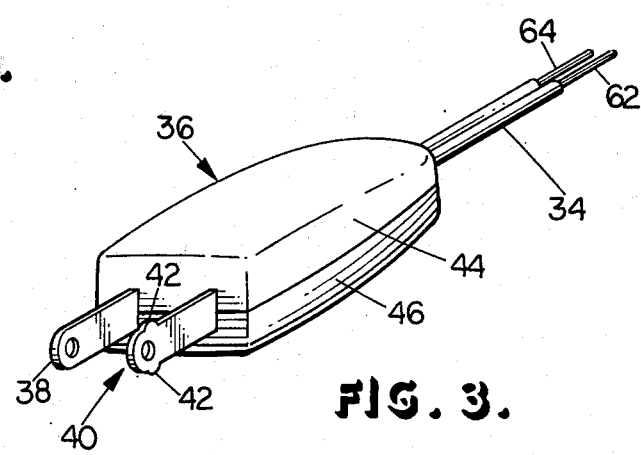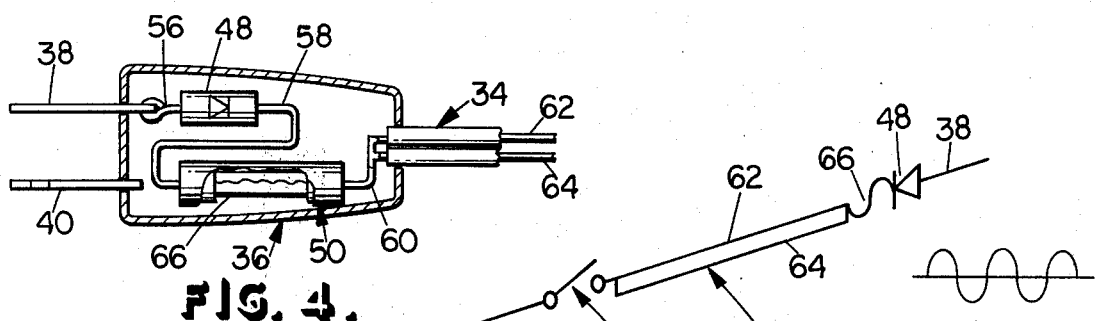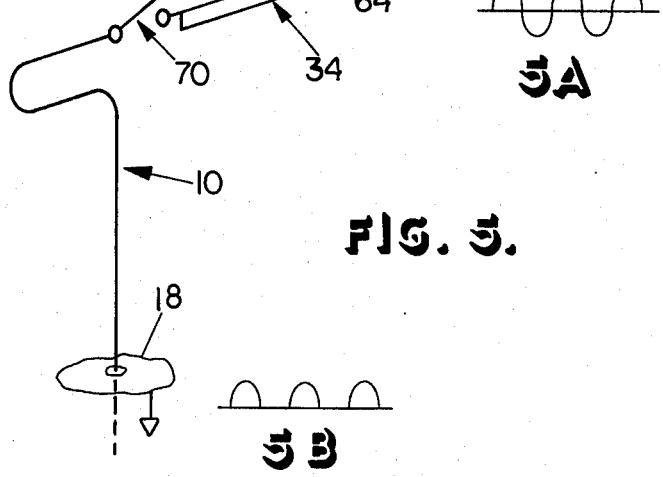

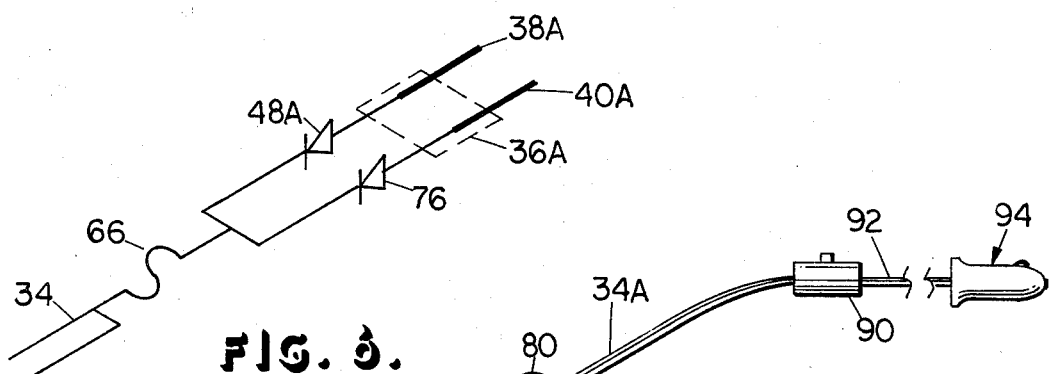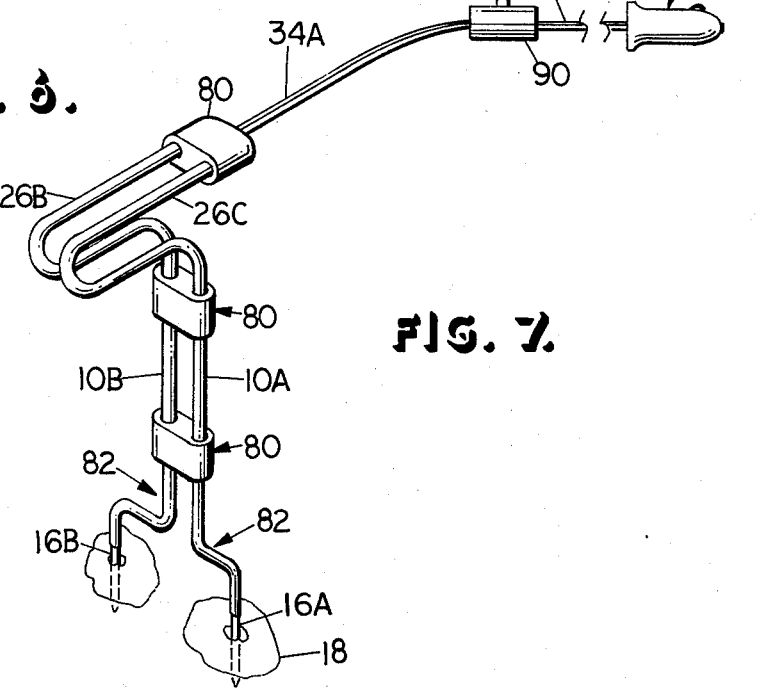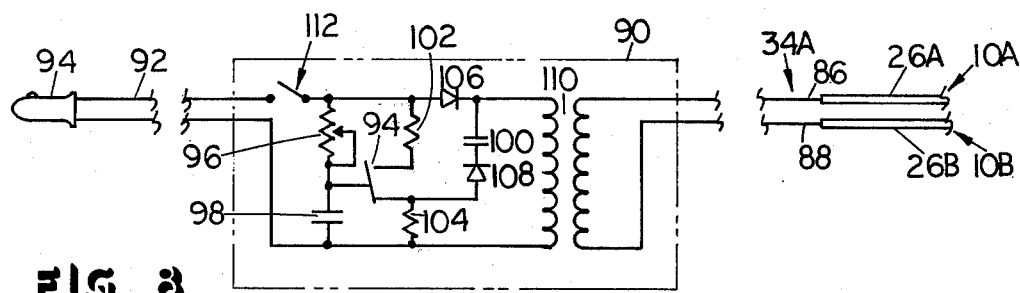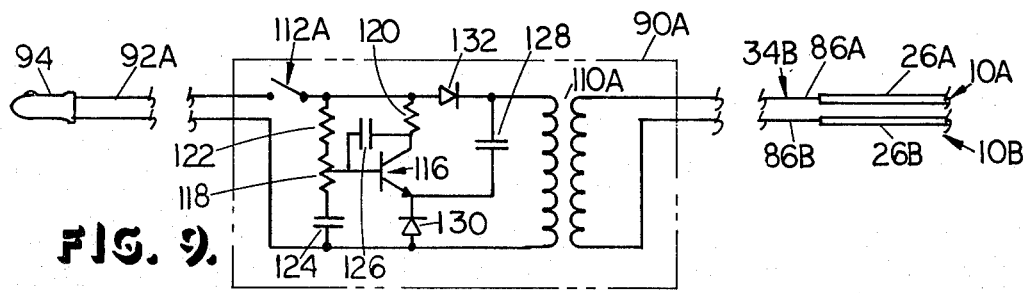

ELECTRIC WORM COLLECTING APPARATUS

BACKGROUND OF THE INVENTION

1. Field of the Invention:

The present invention relates to the field of electric fishing bait lures and, more particularly, to apparatus adapted for introducing a current into the ground to cause worms and the like to come to the surface.

2. Description of the Prior Art:

It has been observed that earthworms, ground boring insects and the like tend to move to the surface of the earth when an electric current is introduced into the adjacent ground. Disclosures, for example, by Karnawski and Moore (U.S. Pat. No. 2,450,597 and 2,770,075 respectively) utilize this effect in apparatus for collecting fishing bait.

However, disclosed and heretofore available apparatus for this purpose, which normally comprise a metal rod or probe having a conducting wire attached thereto, for connecting to a voltage source have had numerous disadvantages, particularly as relating to safety of use and efficiency such apparatus must be plugged in, for example to a household-type voltage outlet, and the electrified or "live" rod inserted into the ground, (or the process reversed). There has been no means for controlling the energizing of the rod at the rod itself. Some portions of the rod--at least that portion which is to be inserted into the ground--must be electrically uninsulated, a safety hazard exists if the exposed portion is contacted, also, the apparatus have generally had no internal current limiting means. Thus, if the uninsulated portion contacts a grounded object, such as a buried water pipe, the apparatus or the wiring related to the voltage outlet may be damaged. In addition, heretofore known apparatus have not been particularly effective for collecting worms.

For these and other reasons, there have to the applicant's knowledge, heretofore been available no safe effective, and comparatively inexpensive electric worm collectors.

SUMMARY OF THE INVENTION

An electric worm collecting apparatus, in accordance with the invention, comprises an electrically conducting element having a first end portion adapted for inserting into the ground and a second end portion adapted for receiving an electrical connection. Means are provided for electrically insulating portions of the element other than the mentioned end portions. Connecting means, adapted for connecting the second element end portion to a voltage source, includes a switch for energizing the element from the voltage source to cause, when the first rod portion is inserted into the ground, on electric current around the element, which in turn causes earth-worms to move to the ground surface where they may be collected. The connecting means includes means for converting voltage from the voltage source to a pulsating, single polarity voltage, thereby causing a pulsating current in the earth to enhance the worm collecting effect.

More specifically, the connecting means includes a plug, preferably polarized, for plugging into a household-type A.C. voltage outlet. A diode is provided in the voltage carrying portion of the conducting means to rectify the A.C. voltage before it is received by the element. A non-polarized plug may also be used, in which case diodes are connected to each plug pin and to a common conductor to the element. A fuse is provided in the connecting means to prevent current overload. An upper portion of the element is formed at right angles to a lower element portion, and includes a portion curved through 180° to serve as a handle for pushing the lower end portion into the ground.

In a D.C. voltage variation of the apparatus, two similar conducting elements, spaced a short distance apart by spacers and in mutual electrical isolation, are employed. A conductor, having wires attached to each element, is terminated in a plug adapted for inserting into an automobile-type cigarette lighter receptacle for connecting to a D.C. voltage source. D.C. voltage chopping circuitry is provided in series with the conductor for supplying a pulsating D.C. voltage to the elements. Lower portions of the elements are formed outwardly and then downwardly to be spaced further apart than other portions of the elements to provide an adequate current path between the two elements when they are inserted in the ground.

An efficient and safe electric worm collector is thereby provided which radiates a pulsating, but not oscillating, current to enhance the worm collecting effect.

BRIEF DESCRIPTION OF THE FIGURES

FIG. 1 is a perspective view of the electric worm collector, showing a lower end portion inserted into the ground;

FIG. 2 is a view along line 2—2 of FIG. 1, showing the normally off, momentary-on switch;

FIG. 3 is a perspective view of the connector plug;

FIG. 4 is horizontal sectional view, showing the fuse and diode;

FIG. 5 is an electrical schematic drawing of the apparatus of FIG. 1; FIG. 5a depicts the input to, and FIG. 5b depicts the output from, the apparatus;

FIG. 6 is an electrical schematic drawing of a variation of the apparatus depicted in FIG. 5;

FIG. 7 is a perspective view of a variation of FIG. 1, adapted for use with a automobile battery;

FIG. 8 is an electrical schematic of circuitry employed in the variation of FIG. 7 to cause a pulsating D.C. voltage; and FIG. 9 is an electrical schematic showing a variation of the method employed to cause a pulsating D.C. voltage.

DESCRIPTION OF THE PREFERRED EMBODIMENT

As seen in FIG. 1, the electric worm collector, or lure, comprises generally a rigid, electrically conducting metal rod or probe 10 and an associated electrical conductor assembly 12. The rod 10 has an elongate vertical portion 14 having a lower end portion 16 adapted for inserting into the ground, (indicated by the reference number 18). To enable easy insertion of the rod 10 into the ground, an upper portion of the rod is formed into a partial loop for gripping. A 90° bend 20 is formed at the upper end of the vertical portion 14; the resulting horizontal portion is curved or bent backwardly upon itself through a 180° bend 22. In this manner, a lower horizontal portion 24 and a longer, horizontal upper portion 26 are formed, the lower portion forming a convenient handle by means of which the end portion 16 may be pushed into the ground 18.

Except for the end portion 16, which may be about 5½ inches long, and a short electrical connection end portion 28 (FIG. 2) at the end of the horizontal upper portion 26, the entire rod is covered with an electrically insulating jacket 30 which may, for example, comprise polyvinyl chloride plastic.

The rod 10 may be joined of any comparatively rigid metal, for example, ¼ inch diameter galvanized iron may be used. Although a cylindrical rod is shown, it may alternatively have a square, rectangular or other cross sectional shape.

Connection of the rod 10 to an A.C. voltage source, for example, to a household outlet, is by means of the conductor assembly 12. At one end of a two wire conductor cord 34 is preferably attached a two pin, polarized connector or plug 36. A first pin 38 of the polarized plug 36, is elongate and regular; a second pin 40, has small upper and lower projections 42 which allow that pin to fit into only the ground side of a polarized household outlet (not shown).

Within the plug 36, which is segmented into an upper segment 44 and a lower segment 46 so that it may be disassembled, is a diode 48 and a fuse holder 50 (FIG. 4). One end of the diode 48 is connected, by a wire 56, to an inner end of the pin 38; the other end of the diode is connected, by a wire 58, to one end of the fuse holder 50. A wire 60 connects the other end of the fuse holder 50 to both wires 62 and 64 of the cord 34. A replaceable fuse 66, which may be an automotive-type fuse having, for example, a 2 amp, 250 volt rating, is contained within the fuse holder 50 and provides current overload protection.

The other end of the cord 34, which may be about 10 feet long, terminates in a switch holder 68 in which is mounted a normally off, momentary-on switch 70 (FIG. 2), a plunger or actuation portion 72 of which extends outwardly through the holder and is covered by a flexible, waterproof cap 73. Within the holder which is preferably waterproof, the wires 62 and 64 of the cord 34 are connected in parallel to one side of the switch 70. The other side of the switch 70 is connected, by a wire 74, to the exposed end portion 28 of the rod 10.

An electrical schematic of the apparatus is depicted in FIG. 5. The pin 38, diode 48, fuse 66, cord 34, switch 70 and rod 10 are connected in series. The pin 38 is plugged into the voltage or "hot" side of a householdtype outlet having a 60 cycle, 120 volt output (as shown in 5a). The diode 48, which may be a 2 amp, 400 volt diode, rectifies the household voltage into a half wave output, (shown in 5b) at the rod 10 (which is inserted in the ground to complete the circuit). The diode 48 creates a pulsating voltage output, such a pulsating voltage having been found to provide improved worm collecting results over use of normal A.C. voltage by providing a pulsating, non-oscillating current, having a single polarity, in the ground.

The fuse 48 provides current limitation, protecting both the apparatus and the household circuit into which it is plugged from possible damage in the event of a short circuit or high current condition. System safety is provided by the normally off, momentary-on switch 70, which causes energizing of the rod 10 only when the plunger 72 is maintained in a depressed condition.

For operation, the plug 36 is plugged into a householdtype A.C. voltage outlet and the lower rod end portion 16 is pushed several inches into the ground. The switch plunger 72 is depressed to energize the rod 10 and cause a pulsating current in the ground adjacent to the rod end portion 16, thereby causing worms in that locality to come to the surface of the ground where they can readily be collected.

Many older residences, however, are not equipped with polarized A.C. voltage outlets which will accomodate the polarized plug 36, the outlet openings being capable of receiving only a straight plug pin like the pin 38 and not a shaped pin like the polarizing pin 40. Also, many extension cords which may be desired for use with the worm collecting apparatus are not adapted for receiving the polarized plug 36. For such purposes, the apparatus may alternatively be provided with an unpolarized plug 36a (FIG. 6). When so provided, a diode 48a is connected in series with the plug pin 38a and a second diode 76 is connected in series with the other plug pin 40a, neither of the pins 38a or 40a being shaped for polarizing a common conductor 34 is connected to both of the diodes 48a and 76. The plug 36a may be plugged into any outlet or extension cord---unpolarized or polarized--in either of the two possible orientations without danger, because of the two diodes 48a and 76, of a short circuit being created when the rod end portion 16 is inserted into the ground.

FIGS. 7–9 illustrate a variation of the above described apparatus which is adapted for use with a D.C. voltage source, for example, an automobile-type battery. Two rods 10a and 10b, each similar to the rod 10, are mounted in mutual spaced relationship and in mutual electrical isolation by a plurality of short spacers 80. To optimize the worm collecting effect by providing a comparatively long current path, lower portions of the two rods 10a and 10b are bent outwardly away from each other and then downwardly so that lower end portions 16a and 16b are parallel to each other, but spaced to be several inches apart. In operation, the current is between these end portions.

Upper horizontal portions 26a and 26b of the rods 10a and 10b, respectively, may be formed to be parallel, as shown in FIG. 7, or to be directed in opposite directions. A short, twowire electrical conductor 34a is connected at one end to ends of the horizontal rod portions, a first wire 86 being connected to the portion 26a and a second wire 88 being connected to the rod portion 26b (FIG. 8), and at the opposite end to a control box 90.

Within the box 90, the voltage reserved from a D.C. source, by an elongate conductor 92 (connected at one end to the box and at the other end to a conventional plug 94 adapted for plugging into an automobile-type cigarette lighter receptacle) is converted or "chopped" into a pulsating voltage. As depicted in FIG. 8, the chopping circuitry within the box 90 comprises a unifunction transistor 94, a variable resistor 96, first and second capacitors 98 and 100, load resistors 102 and 104, first and second diodes 106 and 108 and a transformer 110 interconnected, in a manner well known to those skilled in the art, to interrupt or chop the D.C. voltage reserved from the plug 94 and to deliver a pulsating voltage to the rods 10a and 10b. A normally off, momentary-on switch 112 controls operation of the circuitry in the box and energizing of the rods 10a and 10b. Preferably the box 90 is constructed for allowing access to the electronic components contained therewithin. It is also constructed to be comparatively waterproof.

Another method for chopping the D.C. voltage received by the plug 94 is illustrated schematically in FIG. 9, which depicts a control box 90a which is similar to the box 90. The circuitry of FIG. 9 comprises a transistor 116, a variable base resistor 118, a collector resistor 120, a third resistor 122, first, second and third capacitors 124, 126 and 128, first and second diodes 130 and 132 and a transformer 110a, interconnected, in a manner known to those skilled in the art, to form a chopping circuit. A switch 112a controls operation of the circuitry in the box 90a and energizing of the rods 10a and 10b connected thereto by a conductor 34b. A conductor 92a connects the box 90a to the plug 94.

Although the D.C. operated apparatus described just above is illustrated and described as utilizing a plug 94 which is adapted for plugging into a standard cigarette lighter receptacle, it is to be understood that other means may be ued for connection to a D.C. voltage source. For example, the conductors 92, 92a may alternatively terminate in clamps (not shown) adapted for direct connection to a storage battery. In such case, it is desirable to include a fuse (not shown) in the circuitry within the box 90 or 90a to protect the circuitry against current overload conditions. When the plug 94 is employed, such protection is normally obtained through a fused cigarette lighter receptacle.

Operation of the variation of FIGS. 7–9 is substantially the same as that described for the preferred embodiment described above. The ends 16a and 16b of the rods 10a and 10b are pushed into the ground 18 and the switch 112 or 112a is pressed to energize the rods and create a pulsating current between the mentioned ends, thereby forcing worms in the vicinity to the surface of the ground where they may be collected.

The above description is given by way of example and illustration only, it being clearly understood that the scope of the invention is limited solely by the appended claims.

What is claimed is:

1. An electric worm collecting apparatus, which comprises:
    a. an electrically conducting element,
       said element having a first portion adapted for inserting into the ground and having a second portion for receiving an electrical connection,
    b. insulating means for insulating portions of said element other than said first and second portions, and
    c. means adapted for connecting said second portion of said element to a voltage source,
       said means including means for converting voltage from a voltage source to a pulsating voltage of a single polarity whereby when said first portion of said element is inserted in the ground a pulsating, nonoscillating current is caused in the ground adjacent to said first portion to cause worms to come to the surface.

2. The invention as claimed in claim 1, wherein said connecting means includes a normally of, momentary-on actuating switch, whereby said element is energized from said voltage source only when an activating portion of said switch is held depressed.

3. The invention as claimed in claim 1, wherein said connecting means includes a plug adapted for plugging into an A.C. voltage outlet and also includes a current limiting element.

4. The invention as claimed in claim 3, wherein said plug includes polarizing means whereby said plug may be plugged into an A.C. voltage source outlet only in an orientation to cause voltage from the voltage side of the A.C. source to be connected to said second portion of said element.

5. The invention as claimed in claim 3, wherein said plug has two unpolarized pins and said voltage converting means includes diodes connected in series with both of said pins and an electrical conductor connected to said diodes and to said element.

6. The invention as claimed in claim 1, wherein said voltage converting means includes a diode connected in series with said second portion of said element.

7. The invention as claimed in claim 1, including a second element similar to said first mentioned element, and means for maintaining said second and said first mentioned elements in mutual spaced relationship and in mutual electrical isolation, said connecting means being adapted for connecting said elements to a D.C. voltage source.

8. The invention as claimed in claim 7, wherein said connecting means includes a plug adapted for plugging into an automobile-type cigarette lighter receptacle.

9. The invention as claimed in claim 7, wherein said voltage converting means includes D.C. voltage chopping means.

10. An electric worm collecting apparatus, which comprises:
    a. an electrically conducting element
       said element comprising a rod formed to have a second portion substantially at right angles to a first portion thereof.
       said first portion having a lower end portion adapted for inserting into the ground, said second portion having an end portion adapted for receiving an electrical connection,
    b. insulating means for electrically insulating portions of said element other than said end portions thereof, and
    c. connecting means adapted for connecting said second end portion to an A.C. voltage outlet,
       said connecting means including a plug adapted to plug into an A.C. voltage source outlet and including diode means for rectifying an A.C. voltage received from an A.C. voltage source said connecting means further including switching means for causing energizing of said element from an A.C. voltage source when said lower end portion is inserted in the ground a pulsating, nonoscillating current is caused around said lower end portion.

11. The invention as claimed in claim 10, wherein said plug is polarized and is adapted for plugging into a polarized A.C. voltage outlet.

12. The invention as claimed in claim 10, wherein said connecting means includes a fuse means to limit current through said element.

13. The invention as claimed in claim 10, whereas portions of said second element portion are curved through approximately 180° to form a handle for pushing said lower end portion into the ground.

14. An electric worm collecting apparatus which comprises:
    a. a pair of electrically conducting elements,
       said elements comprising rods formed to have second portions substantially at right angles to first portions thereof,
       said first portions having first lower end portions adapted for inserting into the ground and having second end portions adapted for receiving an electrical connection.

b. insulating means for electrically insulating said elements other than said end portions, c. means connected to said elements for maintaining said elements in mutual spaced relationship, and d. connecting means adapted for connecting said second end portions to a D.C. voltage source, said connecting means including switching means for causing energizing of said elements from the D.C. voltage source, said connecting means also including D.C. voltage chopping means for causing pulsating of voltage received from the D.C. voltage source to thereby cause a pulsating, nonoscillating current in the ground between said lower end portions when said lower end portions are inserted into the ground.

15. The invention as claimed in claim 14, wherein said connecting means includes a plug adapted for plugging into an automobile-type cigarette lighter receptacle.

16. The invention as claimed in claim 14, wherein said elements are formed to have said lower end portions spaced substantially farther apart than other portions of said elements when maintained in said spaced relationship.

* * * * *